United States Patent

[11] 3,572,067

[72] Inventors Dan R. Kimberlin;
Frederick C. Riffelmacher, Saginaw, Mich.
[21] Appl. No. 846,881
[22] Filed Aug. 1, 1969
[45] Patented Mar. 23, 1971
[73] Assignee General Motors Corporation
Detroit, Mich.

[54] STEERING COLUMN LOCK
4 Claims, 7 Drawing Figs.
[52] U.S. Cl. ............................................. 70/252
[51] Int. Cl. ....................................... B60r 25/02,
E05b 65/12
[50] Field of Search .................................. 70/252;
200/44

[56] References Cited
UNITED STATES PATENTS
1,830,265 11/1931 Fairchild ..................... 70/252
2,184,652 12/1939 Sandberg ..................... 70/252X
3,490,255 1/1970 Wight et al. .................. 70/252

Primary Examiner—Marvin A. Champion
Assistant Examiner—Albert G. Craig, Jr.
Attorneys—W. E. Finken and D. L. Ellis ABSTRACT: A motor vehicle-steering column lock of the type having a lock bolt movable between locking and unlocking positions with relation to the vehicle-steering shaft and an ignition and starter switch assembly both controlled by a key-operated rotatable cylinder lock further includes a finger-operated blocking lever operative to prevent key rotation of the cylinder lock actuator to a position placing the lock in locked condition until the blocking lever is first consciously depressed preparatory to the actuating rotation on the lock cylinder actuator.

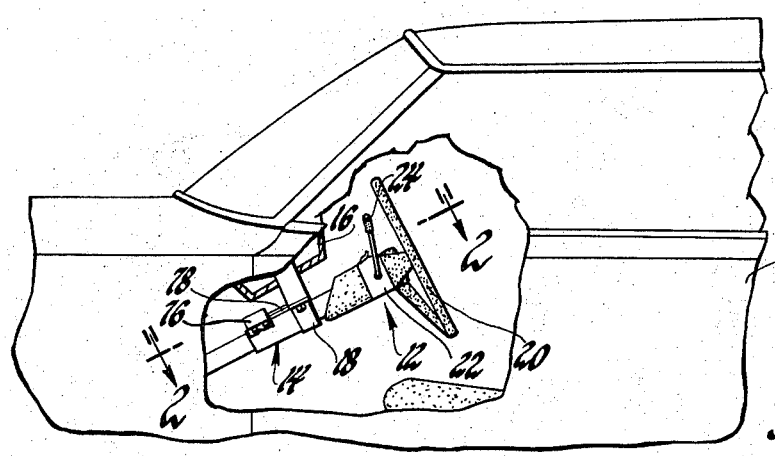
Fig. 1
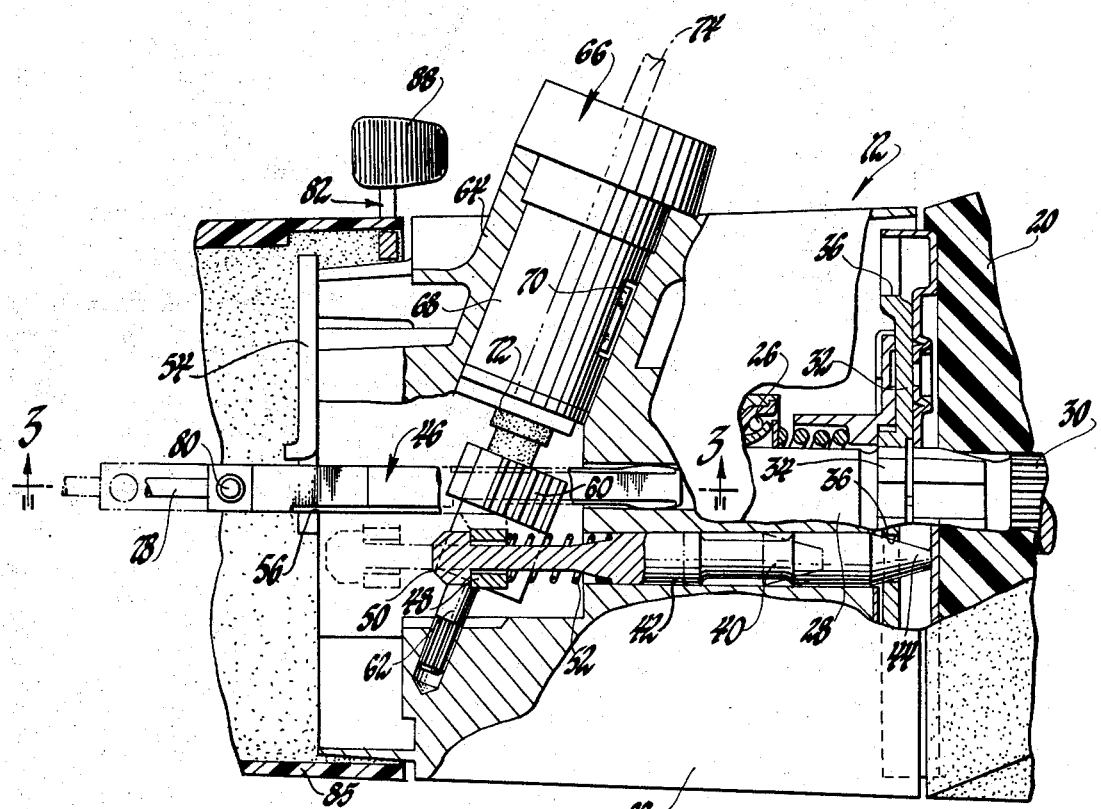
Fig. 2
Fig. 3
INVENTORS
Don R. Kimberlin &
BY Frederick C. Riffelmacher
D. L. Ellis
ATTORNEY

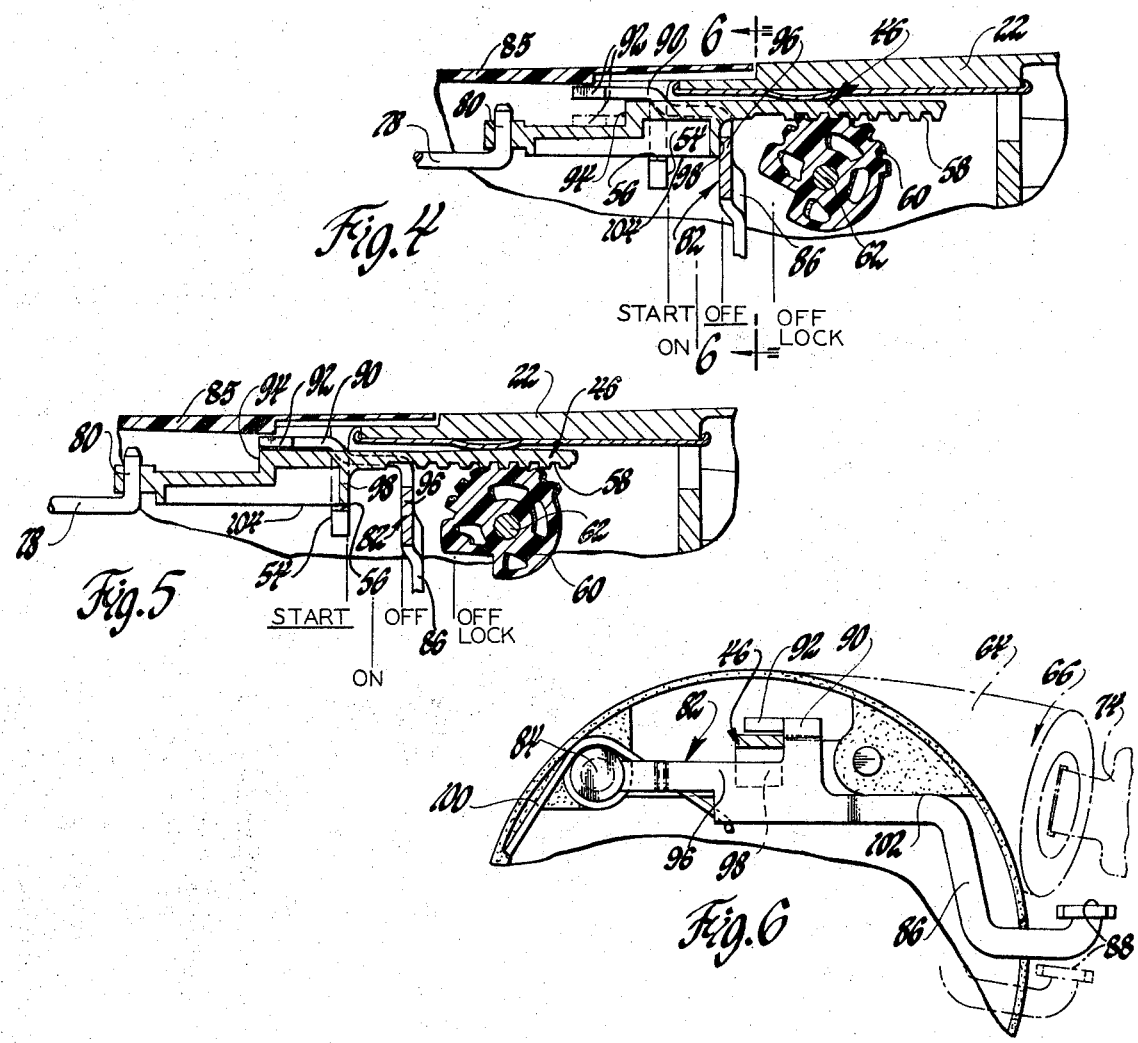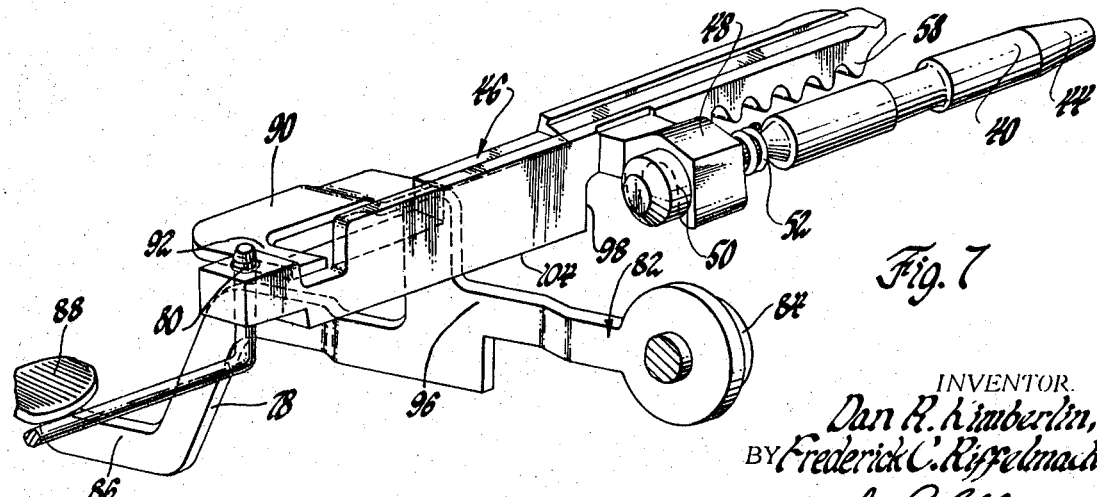

STEERING COLUMN LOCK

This invention has as its primary feature the provision of an improved automotive vehicle coincidental-steering column lock of the type including only steering shaft and ignition switch-locking functions wherein the likelihood of inadvertent locking of the steering shaft is substantially reduced or eliminated.

Another feature of this invention is in the provision of a steering column lock of the described type having a lock bolt assembly cooperable with the keeper on the steering shaft component of the steering column, a control switch for the various vehicle electrical ignition, starter and accessory systems, and a key-operated cylinder lock actuator mounted on the steering column and connected operatively with both the steering column lock and the control switch for simultaneous actuation thereof by selected key rotation of the actuator, the actuator being permitted normal rotation to selectively unlock the steering shaft and energize the vehicle ignition and starter systems but being prevented inadvertent reverse actuation to place the steering shaft bolt in locked position except upon a conscious preparatory actuation of a blocking lever normally located within the path of locking movement of the lock bolt assembly.

A further feature of the invention is that the blocking lever is disposed adjacent the key-operated actuator in such position as to require a deliberate effort to remove the blocking lever from blocking position yet conveniently close enough so that the blocking lever may be depressed by one finger of the operator's hand while other fingers of the same hand simultaneously rotate the cylinder lock actuator.

Still another feature of this invention is that the blocking lever is provided with means preventing foiling of the blocking function of the blocking lever as by permanently affixing the blocking lever in unblocking position; specifically, the provision of an integral formation on the blocking lever which in the depressed unblocking position thereof serves to prevent manipulation of the cylinder lock actuator to some normal position other than locking position such as that for energizing the ignition or for starting of the vehicle engine.

These and other features and advantages of the invention will be readily apparent from the following specification and from the drawings wherein:

FIG. 1 is a fragmentary partially broken away view of a vehicle body including a steering column and steering column lock according to this invention;

FIG. 2 is an enlarged partially broken away view taken along the plane indicated by lines 2–2 of FIG. 1;

FIG. 3 is a sectional view taken generally along the plane indicated by lines 3–3 of FIG. 2 showing the position of the parts in the locked or "off-lock" position of the steering column lock;

FIG. 4 is a view similar to FIG. 3 showing the position of the parts in the "off" position of the steering column lock;

FIG. 5 is a view similar to FIG. 3 showing the position of the parts in the "start" position of the steering column lock;

FIG. 6 is a sectional view taken generally along the plane indicated by lines 6–6 of FIG. 4; and FIG. 7 is a perspective view.

With particular reference to FIG. 1 of the drawings, a vehicle body 10 includes within its passenger compartment a steering column 12 extending forwardly of the vehicle from the passenger compartment through the fire wall thereof to connection with the vehicle-steering gear and the vehicle engine compartment, not shown. The column is conventional and includes an outer energy absorbing tubular supporting jacket 14 suitably mounted to the vehicle fire wall and to the vehicle instrument panel 16 by a bracket 18. At its upper end, the steering column mounts a conventional steering wheel 20 which has connection to be described with the vehicle-steering shaft assembly, which latter is rotatably supported by jacket 14 and extends therethrough to connection with the vehicle-steering gear. Immediately below the hub of the steering wheel is a stationary housing 22 of the steering column attached rigidly with the jacket 14 and which serves to mount the vehicle-steering column lock of this invention, and further a turn signal mechanism operable by a lever 24 extending from the housing.

Referring now to FIG. 2, the housing 22 of the steering column is generally of die cast construction provided with a suitable central bore for mounting bearings such as 26 receiving the upper portion of the steering shaft assembly, such upper portion being designated 28. Manual steering effort on the steering wheel 20 is transferred through splines 30 to the upper steering shaft portion 28 for control of the vehicle-steering gear. Immediately below the hub of steering wheel 20 and generally within the confines of the upper end portion of housing 22 is an annular keeper plate 32 nonrotatably mounted to the upper steering shaft portion 28 as by splines 34. The keeper plate includes on its periphery several keeper notches 36 for receiving the locking head of a steering column lock bolt to prevent normal manual rotation of the steering wheel and the steering shaft assembly.

The steering column lock includes a generally cylindrical elongated lock bolt 40 mounted for reciprocation within an elongated bore 42 of the housing 22 for movement between the locking position shown in solid lines in FIG. 2, wherein a tapered locking head 44 of the bolt is receivable within any of the notches 36, and an unlocking position indicated in broken lines. Further mounted suitably within a similar bore or passage of the housing 22 is a rack member adapted for sliding movement as a unit with lock bolt 40 longitudinally of housing 22 between the locked and unlocked positions of the lock bolt. As seen best in FIG. 7, an ear 48 extending laterally of the rack 46 is engaged over a reduced diameter shank portion of the lock bolt and abuts a head 50 thereof, a coil compression spring 52 seating between the other side of the ear and the shoulder on the lock bolt. A plate 54 is suitably mounted to the lower end of housing 22 and notched at 56 to slidably receive and support the lower end of rack 46. At its opposite end, the rack is provided on its undersurface with a series of rack teeth 58 meshing with a gear sector 60 rotatably supported on housing 22 by a shaft 62 therein.

Housing 22 is provided with a boss portion 64 fixedly mounting within a bore thereof the casing 68 of a key-operated cylinder lock actuator assembly 66. As is conventional, the casing 68 of the actuator rotatably mounts therewithin a lock cylinder core provided with suitable key-operated tumblers or the like operative to withdraw a side locking bar 70 from a slot in the casing when the key is inserted in the core, thereby to allow actuating rotation of the core, or to extend the bar 70 to within the slot when the key is withdrawn thereby locking the actuator against core rotation. The core, indicated at 72, is provided with suitable nonrotatable coupling with the sector 60 so that selected rotation of the cylinder lock core by the coded key, indicated at 74, will reciprocate the unit of rack 46 and bolt 40 between the locked and unlocked positions of the bolt shown in the drawings.

Referring to FIGS. 1 and 2, the coincidental steering column lock further controls by selected key rotation of the actuator 66 a generally conventional ignition and starter system switch shown at 76, the switch body being mounted on the mast jacket 14. The control element of switch 76 connects with a reciprocable rod 78 extending from the switch to in turn have connection with the rack 46 at 80. As indicated best in FIGS. 3 through 5, the rack 46, the lock bolt 40, the rod 78 and the control element of switch 76 are movable as a unit by the actuator 66 longitudinally of the housing 22 and the mast jacket between a plurality of circuit controlling positions corresponding to the various conditions of switch 76, specifically an "off-lock" and an "off" position in FIGS. 3 and 4 respectively wherein the ignition system is deenergized, an "on" position wherein the ignition system is energized, and a "start" position in FIG. 5 wherein the vehicle-starting system is energized simultaneously with the ignition system. Lock bolt 40 is placed in the locked position thereof engaging head 44 within the keeper plate 32 when actuator 66 occupies "off-lock"

position, it being unlocked in all of the other stated positions. During key rotation of actuator 66 moving the rack 46 of lock bolt 40 to the "off-lock" position thereof from any of such other positions, the spring 52 allows limited lost motion of the lock bolt 40 relative to the rack 46 should none of the keeper notches 36 be aligned with the path of movement of bolt head 44, so that compression is placed in the spring serving to snap the bolt home within an aligned keeper notch when slight rotation occurs as during unauthorized attempts to steer the vehicle.

The steering column lock of this invention further includes means for preventing inadvertent rotation of the actuator 66 from any of the unlocked positions of the lock bolt 40 to the "off-lock" position. Such means include a blocking lever 82, seen best in FIG. 6, situated generally at the lower end of the housing 22 and having one end pivotally mounted at 84 on adjacent shroud portion 85 of housing 22. As indicated also in FIG. 7, the lever 82 has its main portion pivotal about the connection 84 generally within a transverse plane of the steering column intersecting the path of longitudinal movement of the rack 46. The distal portions of lever 82 include a bent leg and an actuating portion 86 extending through a suitable aperture in the shroud structure 85 and carrying a finger piece 88. The blocking lever 82 further includes a longitudinally extending leg 90 having a laterally turned blocking portion 92 functional with respect to a shoulder 94 on the upper surface of rack 46. As indicated best in FIGS. 3 and 6, a further blocking portion 96 in the main body of the blocking lever is functional with respect to a further shoulder 98 of rack 46 on the lower surface thereof. A coil torsion spring 100 wrapped about the pivot 84 biases the blocking lever relative to the housing 22 to a first operative or normal position thereof shown in FIG. 6 wherein the bent leg of the lever engages an abutment 102 of the housing. The blocking lever is pivotable under finger pressure applied to the finger piece 88 against the spring to a second operative position indicated in broken lines in FIG. 6.

Taking now the operational sequence of the steering column lock, it is assumed that the lock is situated in the "off-lock" position shown in FIG. 3, shoulder 98 being the indicator, wherein the lock bolt 40 is in locking position within keeper plate 32. Blocking portion 96 of the blocking lever 82 is pressed by spring 100 against an undersurface 104 of rack 46 so that the lever is held by the latter in the depressed or second operative position. The blocking portion 92 lies closely adjacent the upper surface of the rack but remote from the blocking shoulder 94. To unlock the vehicle for operation, the key 74 is used to manually rotate actuator 66 in a direction causing counterclockwise rotation of sector 60 to displace the rack 46 leftwardly toward the "off," "on" and "start" positions. Once rack 46 reaches the "off" position shown in FIG. 4, torsion spring 100 is allowed to snap the blocking lever 82 upwardly from the depressed or second operative position to the first operative position shown in FIG. 4, wherein the blocking portion 96 is situated in the path of shoulder 98 and the other blocking portion 92 is raised out of the way of blocking shoulder 94. Thus, continued rotation of the actuator toward "on" and "start" positions the latter shown in FIG. 5 is operative to start the vehicle engine whereupon suitable return spring structure conventionally provided in the switch 76 returns the parts to the "on" position indicated in the FIGS. 3 through 5. Where it is desired to turn the vehicle ignition system off, reverse rotation on the actuator 66 by key 74 moves the sector 60 clockwise and reciprocates rack 46 rightwardly bringing blocking shoulder 98 to the "off" position of FIG. 4 and into abutting relation with the blocking portion 96 of the blocking lever. Thereafter, to lock the steering column, finger pressure must be applied to finger piece 88 to pivot the lever to the second operative position thereof removing the blocking portion 96 from the path of shoulder 98. This is conveniently accomplished by using for example the middle finger of the operator's right-hand to depress the finger piece 88. As seen in FIGS. 2 and 6, such actuating finger piece is disposed sufficiently close to actuator 66 that the middle finger may be so employed while using the thumb and index finger to rotate the actuator 66 simultaneously with depression of the blocking lever. Yet, the spacing of the finger piece requires a deliberate effort with this middle or other finger to accomplish the depression. Accordingly, the rack 46 may be returned to the "off-lock" position indicated in FIG. 3 and thereby move the lock bolt 40 to its locking condition.

Provisions are made for thwarting any unwise attempts of the vehicle operator or others to circumvent the blockout operation of lever 82 as by, for example, taping or otherwise affixing the finger piece 88 permanently in the depressed or second operative position shown in broken lines in FIG. 6. Should the operator do this, it is seen that the blocking portion 92 will accordingly be fixed in the depressed condition shown in FIG. 4, and that during any subsequent attempted rotation of the actuator 66 in an authorized manner by key 74 toward the "start" position, the blocking portion 92 lies in the path of shoulder 94 and prevents such rotation of the sector and starting of the vehicle engine. Accordingly, normal operation of the vehicle is prevented and the intended operation of the blocking lever 82 is practically insured.

We claim:

1. In an automotive vehicle-steering column lock of the type including steering shaft bolt means mounted on a stationary housing portion of the steering column for movement along a path extending longitudinally of the column between a locked position engaging a keeper fixed to the rotatable steering shaft element of the column and an unlocked position, a key-operated cylinder lock actuator rotatably mounted on said stationary column portion and being connected with switch means controlling the vehicle ignition system so as to cause energization of such system when rotated to an "on" position and deenergization of the system when rotated to "off" and "off-lock" positions, said actuator being further connected with said bolt means for unitary movement therewith to locate the latter in the unlocked position thereof when said actuator is in "off" and "on" positions and to locate said bolt means in the locked position thereof in the "off-lock" position of said actuator, the improvement which comprises a blocking member mounted on said stationary housing portion for movement between blocking and unblocking positions, said bolt means including a blocking shoulder thereon, said blocking member including a blocking portion movable in a plane generally transverse the path of movement of said bolt means and located in the blocking position of said blocking member within the path of movement of said blocking shoulder to prevent movement of said bolt means and of said actuator from "off" to "off-lock" position, means biasing said blocking member to the blocking position thereof, said blocking member further including an operating portion disposed adjacent said actuator in a position with relation thereto permitting manipulation of the blocking member from blocking to unblocking position against said biasing means by one finger of the operator's hand simultaneously with rotation of said actuator by other fingers of the same hand from "off" to "off-lock" position.

2. In an automotive vehicle-steering column lock of the type including steering shaft bolt means mounted on a stationary housing portion of the steering column for movement along a path extending longitudinally of the column between a locked position engaging a keeper fixed to the rotatable steering shaft element of the column and an unlocked position, a key-operated cylinder lock actuator rotatably mounted on said stationary column portion and being connected with switch means controlling the vehicle ignition and starter systems so as to cause energization of the ignition system when rotated to an "on" position, energization of the starter system when rotated from "on" to "start" positions, and deenergization of the ignition system when rotated to "off" and "off-lock" positions, said actuator being further connected with said bolt means for unitary movement therewith to locate the latter in the unlocked position thereof when said actuator is in "off," "on" and "start" positions and to locate said bolt means in the locked position thereof in the "off-lock" position of said actuator, the improvement which comprises a blocking member mounted on said stationary housing portion for movement between first and second operating positions, said bolt means including blocking shoulder means thereon, said blocking member including blocking means thereon movable in a plane generally transverse the path of movement of said bolt and located in the first operative position of said blocking member within the path of movement of said blocking shoulder means to prevent movement of said bolt means and of said actuator from "off" to "off-lock" position and located in the second operative position of said blocking member within the path of movement of said blocking shoulder means to prevent movement of said bolt means and of said actuator from "on" to "start" position, means biasing said blocking member to the first operative position thereof, said blocking member further including an operating portion manipulable to move said blocking member from the first to the second operative position against said biasing means.

3. In an automotive vehicle-steering column including a rotatable steering shaft therein, a steering column lock comprising, lock bolt means mounted on said column for shiftable movement longitudinally thereof between "off-lock," "off," "on" and "start" positions, vehicle ignition and starter switch means operatively connected with said bolt and having operating modes controlled by movement of the latter between corresponding said positions thereof, a key-operated cylinder lock actuator including a housing mounted on said column and a core mounted rotatably within said housing and operatively connected with said bolt for selectively locating said bolt shiftably in any one of said positions thereof by selected rotation of said actuator core, said lock bolt means including a locking head movable into and out of locking relation with said steering shaft in the "off-lock" and "off" positions of said bolt means respectively and further including first and second blocking shoulders spaced on said bolt means longitudinally of the column, a blocking lever mounted on said column for rotation relative thereto between first and second operative positions generally in a plane disposed transverse the path of movement of said bolt means and including a blocking portion, means biasing said blocking lever to said first operative position thereof wherein said blocking portion is located within the path of movement of said first shoulder preventing movement of said bolt means and said actuator core from said "off" to said "off-lock" position thereof, said blocking portion in the second operative position of said blocking member being located in the path of movement of said second blocking shoulder to prevent movement of said bolt means and said actuator core from the "on" to the "start" position thereof, said blocking lever further including an actuating portion disposed adjacent said cylinder lock actuator housing for manipulation of said blocking lever from the first operative position thereof to the second operative position thereof against said biasing means by one finger of the operator's hand simultaneously with rotation of said cylinder lock core by other fingers of the same hand from said "off" to said "off-lock" position thereof.

4. In an automotive vehicle-steering column including a rotatable steering shaft therein, a steering column lock comprising, a lock bolt assembly mounted on said column for shiftable movement longitudinally thereof between "off-lock," "off," "on" and "start " positions, vehicle ignition and starter switch means operatively connected with said bolt assembly and having operating modes controlled by movement of the latter between corresponding said positions thereof, a key-operated cylinder lock actuator including a housing mounted on said column and a core mounted rotatably within said housing, said lock bolt assembly including a lock bolt and rack means operatively connecting said actuator core with said bolt for selectively locating said bolt shiftably in any one of said positions by selected rotation of said actuator core, said bolt including a locking head movable into and out of locking relation with said steering shaft in the "off-lock" and "off" positions of said bolt respectively, said rack means including first and second blocking shoulders spaced thereon longitudinally of said column, a blocking lever mounted on said column for rotation relative thereto between first and second operative positions generally in a plane disposed transverse the path of movement of said lock bolt assembly and including first and second blocking portions, means biasing said blocking lever to a first operative position thereof, said blocking lever first blocking portion being located in said first operative position of said blocking lever within the path of movement of said first shoulder preventing movement of said lock bolt assembly and said actuator core from said "off" to said "off-lock" position thereof but being removed from the path of said first shoulder in the second operative position of said blocking lever, said blocking lever second blocking portion lying within the path of movement of said second blocking shoulder when said blocking lever is in said second operative position thereof to prevent movement of said lock bolt assembly and said actuator core from said "on" to said "start" positions thereof but being removed from the path of said second blocking shoulder in the first operative position of said blocking lever, said blocking lever further including an actuating portion disposed adjacent said cylinder lock actuator housing for manipulation of said blocking lever from the first operative position thereof to the second operative position thereof against said biasing means by one finger of the operator's hand simultaneously with rotation of said cylinder lock core by other fingers of the same hand from said "off" to said "off-lock" position thereof.